United States Patent
Chung et al.

(10) Patent No.: US 6,476,088 B1
(45) Date of Patent: Nov. 5, 2002

(54) POLYOLEFIN FOAM BEADS HAVING HIGH DENSITY CRUST AND METHOD FOR MANUFACTURING THE SAME

(75) Inventors: Moon Jo Chung; Nak Joong Kim, both of Seoul (KR)

(73) Assignee: Howtech Corporation Ltd., Seoul (KR)

( * ) Notice: Subject to any disclaimer, the term of this patent is extended or adjusted under 35 U.S.C. 154(b) by 102 days.

(21) Appl. No.: 09/761,568

(22) Filed: Jan. 16, 2001

(30) Foreign Application Priority Data

Jan. 26, 2000 (KR) .................... 10-2000-3663

(51) Int. Cl.[7] .................... C08J 9/22; C08J 9/224; C08J 9/36; C08J 9/38
(52) U.S. Cl. .................... 521/60; 521/57
(58) Field of Search .................... 521/56, 60, 57

(56) References Cited

U.S. PATENT DOCUMENTS 5,939,180 A    8/1999    Kobayashi et al.
6,265,463 B1 *  7/2001    August et al.

FOREIGN PATENT DOCUMENTS

| | | |
|---|---|---|
| DE | 19719962 | 11/1998 |
| FR | 2665455 | 2/1992 |
| JP | PCT/JP94/02088 | 6/1996 |

* cited by examiner

*Primary Examiner*—Morton Foelak
(74) *Attorney, Agent, or Firm*—Christensen O'Connor Johnson Kindness PLLC

(57) ABSTRACT

Polyolefin foam bead having a high-density crust and a method for manufacturing the same are disclosed. The novel polyolefin foam bead having an surface layer (crust) which is higher in density than its inner structure can be manufactured by the method comprised of impregnating a polyolefin resin with a forming agent by stirring the mixture of the polyolefin resin particles, water and the foaming agent in a pressure vessel under heat, followed by diffusing out the foaming agent from the surface layer of the resin particle to decrease the concentration of the foaming agent in the surface layer. Thereafter, the polyolefin resin is foamed by discharging the resin particles to low pressure environment.

5 Claims, 2 Drawing Sheets

POLYOLEFIN FOAM BEADS HAVING HIGH DENSITY CRUST AND METHOD FOR MANUFACTURING THE SAME

BACKGROUND OF THE INVENTION

1. Field of the Invention

The present invention relates to polyolefin foam beads, and more particularly to polyolefin foam beads having a high-density crust and a method for manufacturing the same.

2. Description of the Related Art

Polymer foams made from polyurethane, polystyrene, or polyolefin are widely used as a shock absorbing material, heat insulating material, and packing material due to their flexibility, durability, light weight, and low thermal conductivity.

Generally, polyolefin foam products are manufactured by 2 steps. First, polyolefin foam beads are prepared by vaporizing foaming agent impregnated in resin particle, then final foam products having desired shape are manufactured by molding the foam beads under heat.

When the expansion ratio of the foam bead increases, the final foam product becomes lighter and consumes less resin, while the strength and the dimensional stability decreases. In order to improve the strength and the dimensional stability, the expansion ratio of the foam bead should be lowered and the foam product becomes heavier and consumes more resin.

SUMMARY OF THE INVENTION

The object of the present invention is to provide polyolefin foam bead from which final foam product of higher strength and higher dimensional stability can be obtained at higher expansion ration.

In order to achieve the above object, the present invention provides polyolefin foam bead having a surface layer (crust) which is higher in density than its inner structure and a method for manufacturing the same. The method comprises the step of impregnating a polyolefin resin particle with a forming agent by stirring the mixture of resin particles, foaming agent and water in a high pressure vessel under heat, followed by diffusing out the foaming agent in a surface layer (crust) to decrease the concentration of the foaming agent in the surface layer. Thereafter, the resin particles are discharged to a low pressure environment to obtain the foam beads.

BRIEF DESCRIPTION OF THE DRAWINGS

The above objects and other advantages of the present invention will become more apparent by describing in detail Examples thereof with reference to the attached drawings in which.

DETAILED DESCRIPTION OF THE INVENTION

Figure 1A:
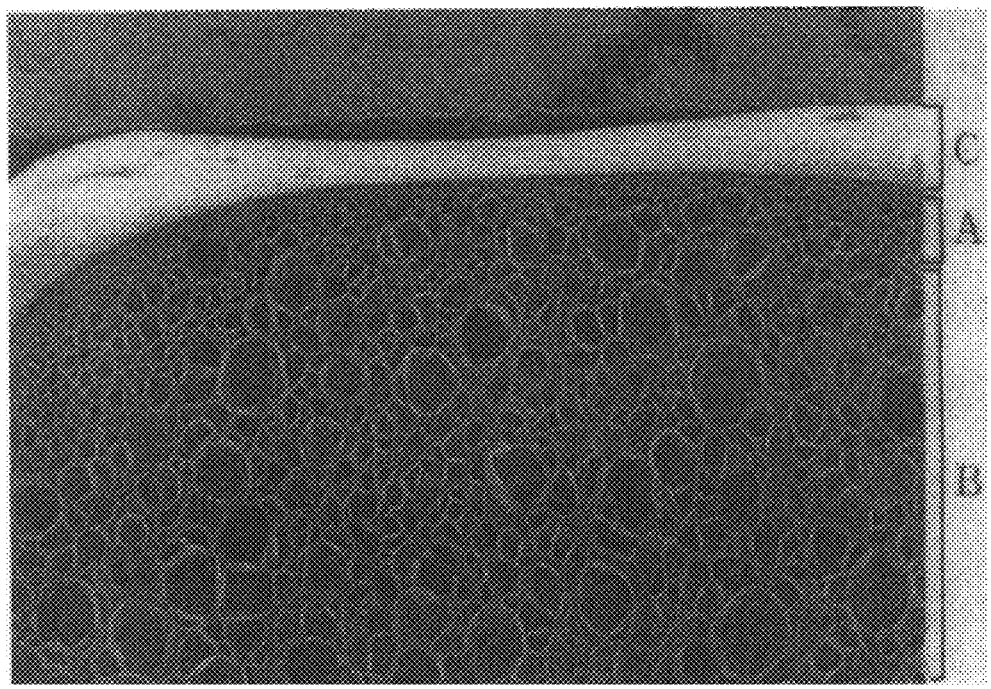
FIG. 1A is a scanning electron microscope (SEM) picture which illustrates a cross-sectional view of a polyolefin foam bead of the present invention.

The present invention will now be described in detail below.

The present invention is constituted by 3 steps, an impregnating step, a diffusing step, and a foaming step.

First, in the impregnating step, foaming agent is impregnated into the resin by stirring the mixture of the resin particles, water and the foaming agent in a high-pressure impregnation chamber under heat, similar to the conventional methods.

For polyolefin resin, polyethylene, polypropylene, or various types of copolymers of ethylene and propylene such as random copolymer, block copolymer, or graft copolymer can be used. Additionally, copolymers comprised of ethylene and propylene and other olefin monomers such as ethylene-propylene-1-butene copolymer, ethylene-propylene-butadiene copolymer can also be used, in addition to copolymers comprised of olefin monomers and non-olefin monomers such as vinyl acetate, styrene.

For foaming agent, CFC-11, CFC-12, propane, butane, pentane, carbon dioxide or any other substance, which has the capability of generating gaseous bubbles in the resin, can be used. It is preferable to use butane or pentane because Montreal Protocol limits the use of CFCs, and propane has a high vapor pressure. Although carbon dioxide is safe in respect to fire and explosion, it needs very high operation pressure.

It is preferable to maintain the temperature of the impregnation chamber between the softening point and the melting point of the resin to facilitate the foaming of the resin particles after discharging to low pressure environment. Hence, the impregnating step is generally carried out at a temperature between about 80–130° C.

The diffusing step, which lowers the concentration of the foaming agent in the surface layer of the resin particle, is an inventive aspect of the present invention.

The impregnation of the foaming agent into the resin is completed when thermodynamic concentration equilibrium of the foaming agent is attained between vapor, liquid, and solid phases. Then, the foaming agent can diffuse out of the resin by lowering the concentration of the foaming agent in its surrounding. Here, the concentration of the foaming agent in the resin starts to lower from its surface layer, and when the rate of diffusion is low in the resin phase, the concentration in the surface layer becomes substantially lower than the inside of the resin during a sort period.

In order to lower the concentration of the foaming agent in the surrounding of the resin particles, various methods can be implemented.

One method is to lower the concentration of the foaming agent in the vapor phase in the impregnation chamber. This can be accomplished by removing the vaporized foaming agent from the impregnation chamber. When the vaporized foaming agent is removed, the foaming agent impregnated in the resin diffuses out to the vapor space to attain a new equilibrium.

Here, the pressure of the impregnation chamber should not be lowered during the removing of the foaming agent vapor by supplying inert gas such as nitrogen into the chamber, because the foaming agent inside the resin vaporizes to make foam when the pressure in the impregnation chamber decreases, Another method to decrease the concentration of the foaming agent in surrounding is decreasing the concentration of the foaming agent in water by replacing the water at equilibrium with water of lower concentration of the foaming agent.

In addition to the methods just descried above, one skilled in the art can implement various other methods of decreasing the concentration of the foaming agent in surrounding of the resin particles without departing the scope of the diffusing step of the present invention.

For example, the upper vapor space in the impregnation chamber can be replaced with water by supplying water to the chamber while venting the vapor, and then an inert gas such as nitrogen can be supplied to the chamber to remove the water. Here, the former replacement with water as well as the subsequent replacement with the inert gas make the foaming agent diffuse out of the resin.

Or, the water is removed first from the impregnation chamber, and then the vapor is replaced next by supplying an inert gas.

After the completion of the diffusing step, the resin particles now having lower concentration in the surface layer than inside are processed by a foaming step, in which the resin particles are discharged to a low pressure expansion chamber and the foaming agent in the resin vaporizes to make foam beads. Here, the surface layer having lower concentration of the foaming agent has less foam density than inside of the foam bead to render a foam bead having a high-density crust. The density and thickness of the crust are determined by the concentration gradient of the foaming agent in the resin particle which is affected by the diffusion rate of the foaming agent in the resin phase and the duration in the diffusing step.

The steps which accompany the method of the present invention described above can be carried out in one vessel (an impregnation chamber), or each step can be carried out in separate vessels provided to be appropriate for each step. For example, the impregnating step is carried out in a high pressure vessel which is manufactured for efficient heat transfer and mixing, then the contents are transferred to another vessel manufactured for easy discharge of the resin in which subsequent diffusing and foaming steps are carried out.

EXAMPLES

The following Examples are provided to further illustrate the invention and are not intended to limit the scope of the present invention.

Comparative Example 1

Figure 2:
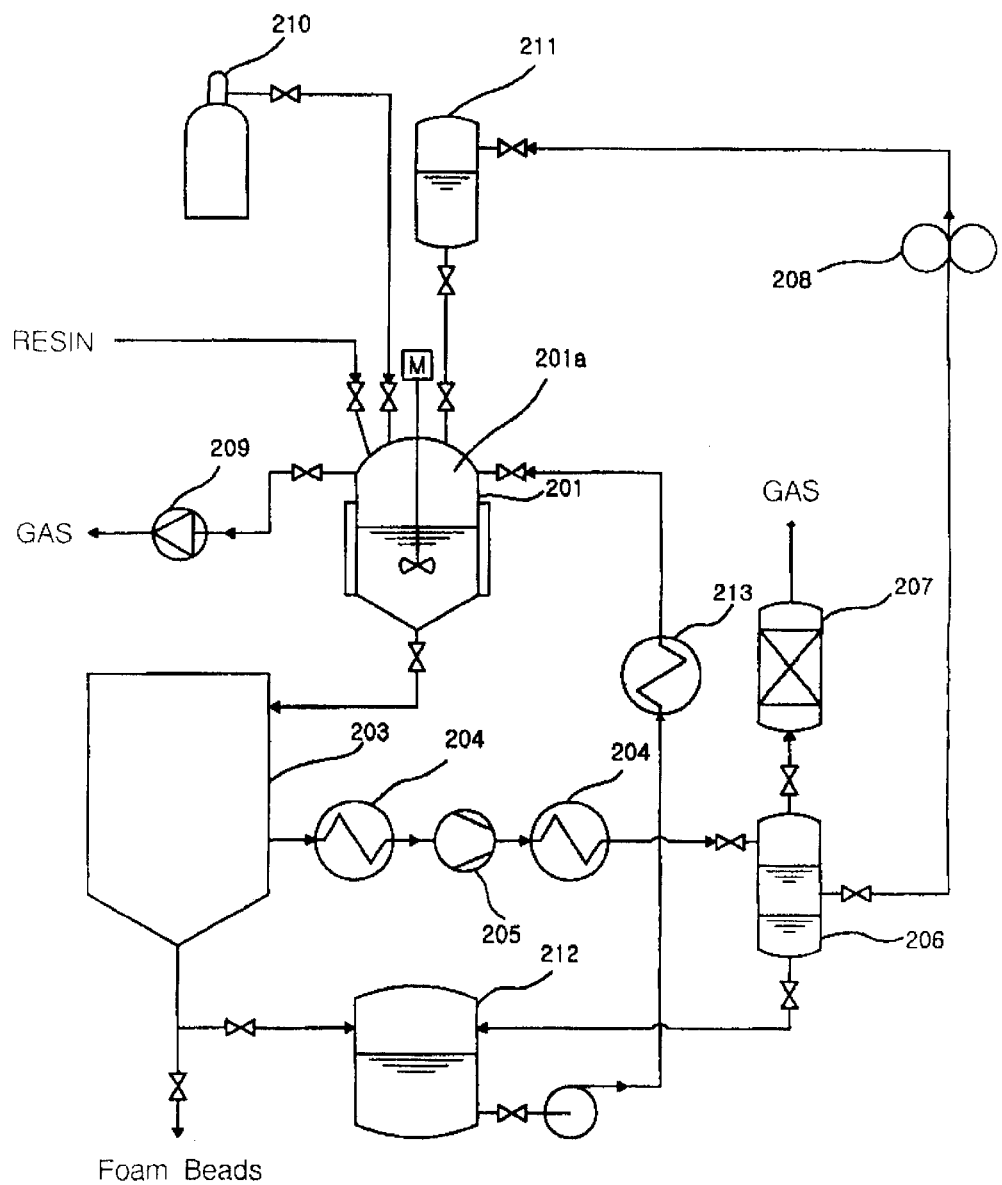
FIG. 2 is a schematic-view which illustrates an equipment utilized to manufacture polyolefin foam beads

By utilizing the equipment shown in FIG. 2, polypropylene foam beads were manufactured by a conventional method. The volume of a impregnation chamber 201 and a expansion chamber 203 was 1 liter and 40 liter, respectively. Polypropylene resin having a diameter of 3mm and a melting point of 164° C. was used, while butane was used as foaming agent and water was used as a dispersing medium.

50 g of the resin and 560 g of water were added into the impregnation chamber 201, and then the air in the chamber was evacuated by a vacuum pump 209. Thereafter, 50 g of butane were added into the impregnation chamber 201. The mixture was then stirred at 200 rpm and heated to 125° C. The impregnation chamber 201 was maintained at 125° C. for 30 minutes at 27 kg/cm$^2$.

After the completion of the impregnating step, all contents in the impregnation chamber 201 were discharged to a low pressure expansion chamber 203, and polypropylene foam beads having an average expansion ratio of 40 were obtained.

Example 1

By utilizing the same equipment used in Comparative Example 1, polypropylene foam beads were manufactured by the method of the present invention.

The impregnating step of the present invention was carried out by the same method as the impregnating step described in Comparative Example 1.

After the completion of the impregnating step, the resin particles impregnated with the foaming agent were subjected to the diffusing step. The vapor mixture in the space 201a was vented for 30 seconds. During the venting of the gas mixture, the stirring was continued and the pressure in the impregnation chamber 201 was maintained at 30 kg/cm$^2$ by supplying nitrogen gas to the chamber.

After the completion of the diffusing step, the foaming step of the present invention was carried out by the same method as the foaming step described in Comparative Example 1.

Figure 1B:
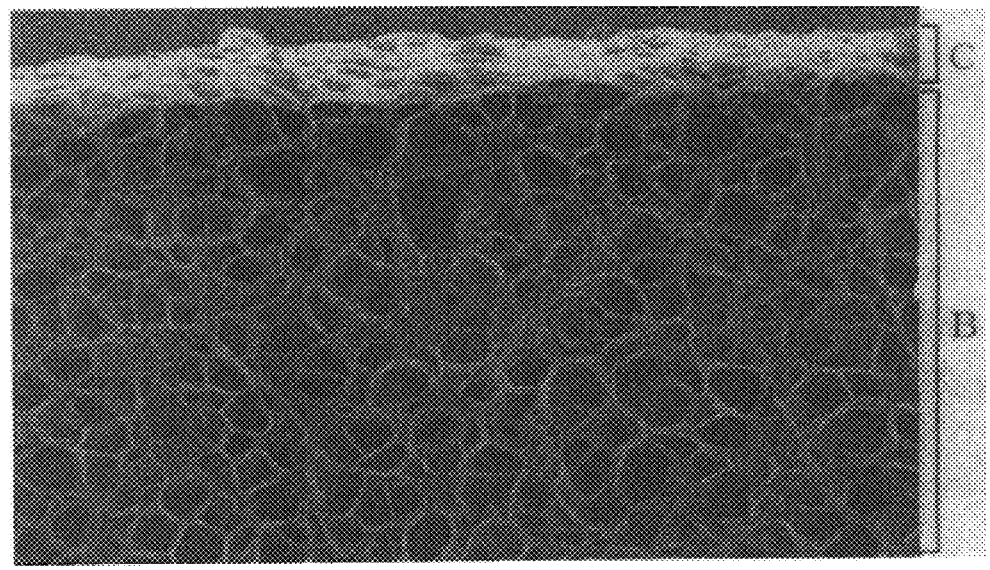
FIG. 1B is a scanning electron microscope (SEM) picture which illustrates a cross-sectional view of a conventional polyolefin foam bead.

A scanning electron microscope (SEM) picture of FIG. 1A shows the cross-section of a polypropylene foam bead obtained by the method of present invention, Example 1. As it can be seen, the bubbles in the surface layer (crust) indicated by A are smaller than inside indicated by B, and the surface is smooth due to the small size of the bubbles in the surface layer as indicated by C. The characteristics of the novel foam bead is apparent when comparing FIG. 1A with FIG. 1B, which is also a SEM picture showing a cross-sectional view of a conventional polyolefin foam bead. The conventional foam bead has uniform bubble size throughout the whole bead and rough surface due to the big bubbles in the surface layer as indicated by C.

The novel foam bead has surface layer of higher density than inside and reveals higher strength and higher dimensional stability than the conventional foam bead at the same average expansion ratio.

Example 2

50 g of polyethylene resin having a diameter of 2 mm and a melting point of 136° C., 50 g of propane (as foaming agent), 560 g of water (as dispersing medium), and the equipment used in Example 1 were utilized.

The resin, propane, and water were added and stirred in the impregnation chamber 201 and heated to 95° C. and maintained at the temperature for 30 minutes at 40 kg/cm$^2$.

Thereafter, the foaming agent in the surface layer of the resin was diffused out by supplying water of 95° C., in which the foaming agent is not dissolved, to the chamber while removing the foaming agent dissolved water and foaming agent vapor form the chamber. The pressure of the chamber was maintained at 40 kg/cm$^2$.

After the completion of the diffusing step, the resin particles were discharged to the low pressure expansion chamber 203, and polyethylene foam beads having a high density crust and an average expansion ratio of about 40 were obtained.

Example 3

50 g of ethylene-propylene copolymer having a diameter of 2 mm and a melting point of 147° C., 60g of pentane (as foaming agent), 560 g of water (as dispersing medium), and the equipment used in Example 1 were utilized.

The resin particles, pentane, and water were added and stirred in the impregnation chamber 201 and heated to 115° C. and maintained at the temperature for 30 minutes at 10 kg/cm$^2$.

Thereafter, the foaming agent in the surface layer of the resin was diffused out by replacing the vapor of the foaming agent in the upper space 201a of the impregnation chamber 201 with water of 115° C., then most of the water in the chamber was removed form the chamber while supplying nitrogen gas to maintain the pressure of 10 kg/cm².

After the completion of the diffusing step, the resin and nitrogen gas were discharged to the low pressure expansion chamber 203, and ethylene-propylene foam beads having a high density crust and an average expanding ratio of 28 were obtained.

Example 4

50 g of ethylene-propylene-butadiene copolymer resin having a diameter of 2 mm and a melting point of 125° C., 50 g of butane (as foaming agent), 560 g of water (as dispersing medium), and the equipment used in Example 1 were utilized.

The resin particles, butane, and water were added and stirred in the impregnation chamber 201 and heated to 100° C. and maintained at the temperature for 30 minutes at 35 kg/cm².

Thereafter, the water in the impregnation chamber 201 was replaced with nitrogen gas supplied with a pressure of 38 kg/cm², and then the nitrogen gas was continuously supplied to remove the vapor of the foaming agent.

After the completion of the diffusing step, the resin and nitrogen gas were discharged to the low pressure expansion chamber 203, and ethylene-propylene-butadiene copolymer foam beads having a high density crust and an average expansion ratio of about 30 were obtained.

As shown and described by the above Examples, polyolefin foam beads having a high density crust can be obtained through the method provided by the present invention. Since the polyolefin foam beads having the same strength and dimensional stability can be obtained with less amount of resin, the method of the present invention provides a viable and economical alternative in manufacturing the polyolefin foam beads.

While the present invention has been particularly shown and described with reference to particular Examples thereof, it will be understood by those skilled in the art that various changes in form and details may be effected therein without departing from the spirit and scope of the invention as defined by the appended claims.

What is claimed is:

1. A method for manufacturing polyolefin foam beads having a high density surface layer comprising the steps of:

impregnating a polyolefin resin with a forming agent by stirring the mixture of the polyolefin resin particles, water and the foaming agent in an impregnation chamber at the temperature between softening point and melting point of the resin;

diffusing out the foaming agent from a surface layer (crust) of the polyolefin resin particle to decrease the concentration of the foaming agent in the surface layer; and foaming the polyolefin resin by discharging the resin particles to low pressure environment.

2. A method for manufacturing polyolefin foam beads having a high density crust as claimed in claim 1, wherein during the diffusing step, the foaming agent vapor in an upper space of the impregnation chamber is discharged outside.

3. A method for manufacturing polyolefin foam beads having a high density crust as claimed in claim 1, wherein during the diffusing step, the water in the impregnation chamber which functions as a dispersing medium is replaced with water having a lower concentration of the foaming agent.

4. A method for manufacturing polyolefin foam beads having a high density crust as claimed in claim 1, wherein during the diffusing step, water is introduced into the impregnation chamber, while the foaming agent vapor is vented out, then an inert gas is introduced into the chamber to remove the water in the chamber.

5. A method for manufacturing polyolefin foam beads having a high density crust as claimed in claim 1, wherein during the diffusing step, the water in the impregnation chamber is removed first, then vapor phase foaming agent is removed by supplying high pressure inert gas.

\* \* \* \* \*